(12) United States Patent
Bahrami et al.

(10) Patent No.: US 10,691,507 B2
(45) Date of Patent: Jun. 23, 2020

(54) API LEARNING

(71) Applicant: FUJITSU LIMITED, Kawasaki-shi, Kanagawa (JP)

(72) Inventors: Mehdi Bahrami, Santa Clara, CA (US); Wei-Peng Chen, Fremont, CA (US); Takuki Kamiya, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 237 days.

(21) Appl. No.: 15/374,798

(22) Filed: Dec. 9, 2016

(65) Prior Publication Data

US 2018/0165135 A1    Jun. 14, 2018

(51) Int. Cl.
*G06F 9/54*    (2006.01)

(52) U.S. Cl.
CPC .................... *G06F 9/541* (2013.01)

(58) Field of Classification Search
CPC ....................................................... G06F 9/541
See application file for complete search history.

(56) References Cited

U.S. PATENT DOCUMENTS

| | | | |
|---|---|---|---|
| 8,510,762 B1 | 8/2013 | Gregorio et al. | |
| 8,726,294 B2 | 5/2014 | Benedek et al. | |
| 8,881,127 B2 | 11/2014 | Mizrachi et al. | |
| 2011/0082688 A1* | 4/2011 | Kim | G06F 17/271 704/9 |
| 2012/0278341 A1* | 11/2012 | Ogilvy | G06F 17/30616 707/749 |

OTHER PUBLICATIONS

Yong-Ju Lee ; Jeong-Hong Kim; Semantically enabled data mashups using ontology learning method for Web APIs; Jan. 11-13, 2012; 6 pages (Year: 2012).*
SPOT: A Smartphone-based Platform to Tackle Heterogeneity in Smart-Home IoT Systems; 21st International Conference on Mobile Computing and Networking (MobiCom 2015), Paris, Sep. 7, 2015.
Pending U.S. Appl. No. 15/148,681, filed May 6, 2016 59 pages, (submitted Dec. 20, 2016).

* cited by examiner

*Primary Examiner* — Doon Y Chow
*Assistant Examiner* — Kimberly L Jordan
(74) *Attorney, Agent, or Firm* — Maschoff Brennan

(57) ABSTRACT

A generic application program interface (API) may learn heterogeneous APIs based on their API documentations that understands functionalities, parameters, operations, accessibility and outputs of APIs. The generic API collects API documentation from different sources based on a target human language by crawling a network such as the Internet. The generic API reads the documents of an API to recognize features of an API including type of services, concepts, protocols, accessibility methods, security methods, functionalities, outputs and base operations. Each given instruction for different APIs is mapped to generic API features. A programmer or end-user have access to multiple and heterogeneous APIs based on the generic API. The generic API provides a unified interface that allows a programmer or end-user to interact with different target APIs through the generic API. By raising a request to generic API a native API code is generated, executed and returns to the programmer or end-user.

18 Claims, 14 Drawing Sheets

API LEARNING

FIELD

The embodiments discussed herein are related to an API learning system and related methods.

BACKGROUND

An Application Programming Interface (API) is a set of routines, protocols, and tools for building software applications. An API specifies how software components should interact and APIs are used when programming graphical user interface (GUI) components. An API typically exposes functions or data of a software application that enables other applications to use the API's resources without concern for implementation of the functions or data.

The subject matter claimed herein is not limited to embodiments that solve any disadvantages or that operate only in environments such as those described. Rather, this background is only provided to illustrate one example technology area where some embodiments described herein may be practiced.

SUMMARY

According to an aspect of an embodiment, a system includes a communication interface and a processor operatively coupled to the communication interface. The processor is configured to crawl the Internet or an intranet, via the communication interface, one or more sources for application program interface (API) documentation. The processor is further configured to collect, via the communication interface, an API document from the one or more sources from the Internet. The processor is also configured to tokenize the API document to create at least one token based on content of the API document. The content includes at least one webpage with at least two sentences. The processor is configured to generate an API ontology graph based on the at least one token. The processor is further configured to develop a semantic view for each sentence of the at least two sentences of the API document based on the API ontology. The processor is also configured to associate a priority with each sentence of the at least two sentences of the API document. The processor is configured to select each sentence of the at least two sentences of the API document based on a first priority of each sentence. The generated semantic view allows the processor to extract data and understand functionalities, methods, parameters, feature of different APIs. The processor is configured to interact with different APIs.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
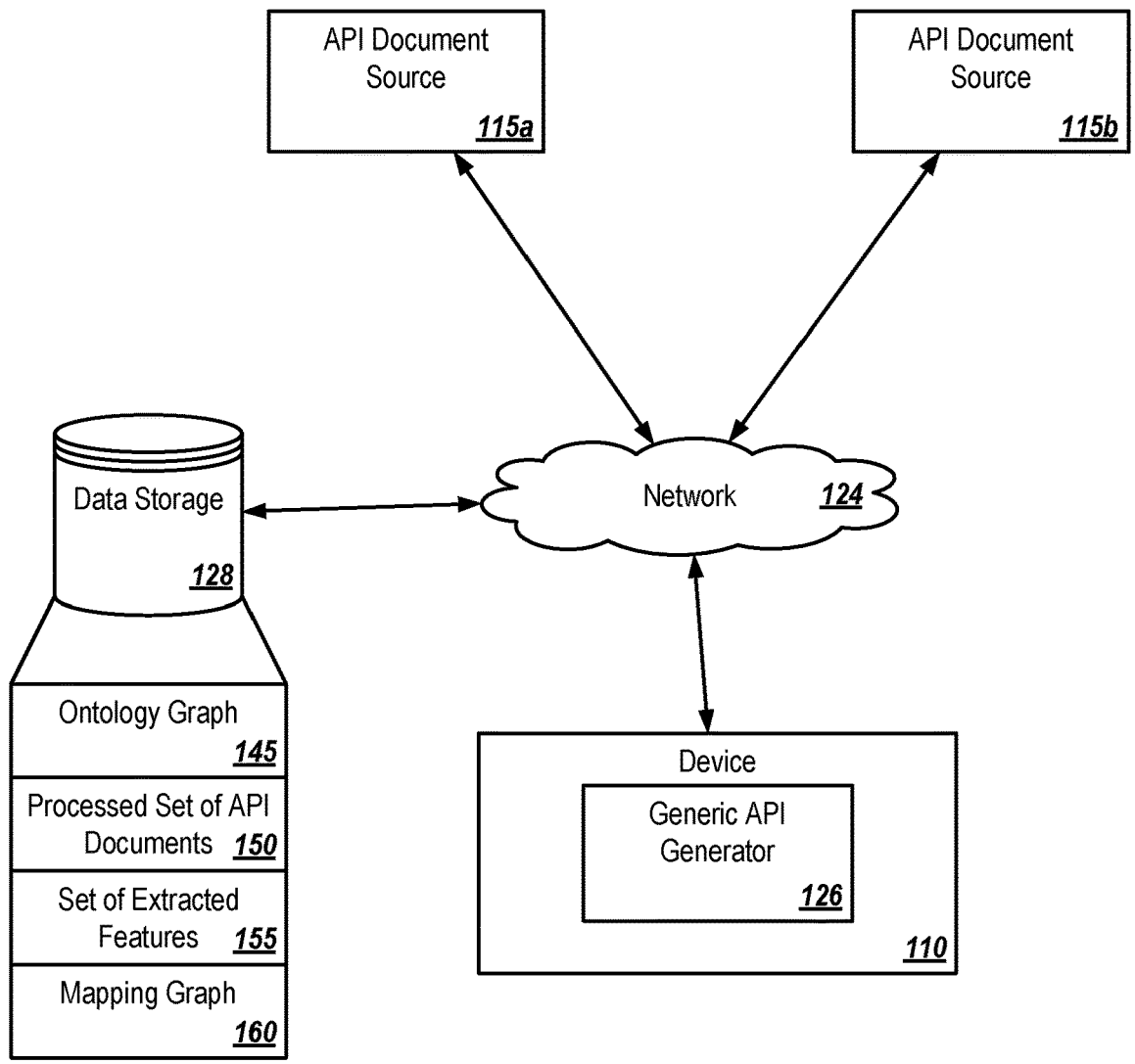
FIG. 1 illustrates a block diagram of an example operating environment of an API learning system.

There are several types of APIs. A web API, for example, may expose its functions and data through a web service in the Internet or an intranet. A device API may expose device hardware modules functionalities to other devices and/or software. An application API may provide access to a database or a function of a software application, such as through an operating system. Typically, APIs may be useful for developers when implementing a new system based on services, functions or data provided from or through APIs. Conventional APIs often work as a "black box" that provide a service while the developer is not typically able to see inside the black box to identify detail of the implementation. Some APIs may abstract the complexity of a system and some APIs may hide some details from developers that may reduce flexibility in the implementation.

Each API typically publishes its own services and/or data through different protocols having different types of data with different attributes. This conventional approach may cause a heterogeneously issue when a developer is working with a variety of APIs. Further, most APIs do not have formal definition and most of them are human readable description which is described as an HTML file. As a result, software developers typically read and learn the API documentation in order to access and interact with an API function. API functionalities and their documentation can be updated periodically, after which the developer will need to read and learn the new API documentation and then, revise his/her own application based on the new API functionalities. To further complicate software development, each API may be accessible through different programming languages.

Aspects of the present disclosure address these and other shortcomings of APIs and related systems by providing a generic API. A unified API language provided by the generic API may help software developers and end users to interact with different APIs with one interface and/or language. Using the generic API, a developer and/or end user may interact with different APIs through a unified interface that maps each individual element to a unified generic API. In addition, the generic API learns new documentation through the processor which may be updated periodically in order to maintain up-to-date access to different APIs.

The generic API may intelligently recognize heterogeneous APIs based on their functionalities, parameters, operations and accessibility through collecting API documentation from a target human language (e.g., English, Japanese, German, etc.). Second, the generic API reads the documents of an API to recognize features of an API including type of service, protocols, accessibility methods, security methods, functionalities, parameters, attributes and its base operations as well as output formats. Each given instruction for different APIs is mapped to the generic API features. A programmer or end-user may then have access to multiple and heterogeneous APIs based on the generic API. The generic API provides an Integrated Development Environment (IDE) that may allow a programmer to use a unified code to interact with different target APIs and the generic API is able to provide target native API code.

Some embodiments described herein enable integration of devices that communicate on multiple protocols. Additionally, once incorporated into a device configuration, the devices may communicate peer-to-peer without necessarily passing through a central system.

FIG. 1 illustrates a block diagram of an example operating environment 100 of an API learning system, arranged in accordance with at least one embodiment described herein. As depicted in FIG. 1, the operating environment 100 may include a device 110, one or more API document sources 115, a network 124 and a data storage 128.

The device 110 may include a computer-based hardware device that includes a processor, memory, and communication capabilities. The device 110 may be coupled to the network 124 to communicate data with any of the other components of the operating environment 100. Some examples of the device 110 may include a mobile phone, a smartphone, a tablet computer, a laptop computer, a desktop computer, a set-top box, a virtual-reality device, or a connected device, etc. The device 110 may include a processor-based computing device. For example, the device 110 may include a hardware server or another processor-based computing device configured to function as a server. The device 110 may include memory and network communication capabilities.

The one or more API document sources 115 may include any computer-based source for API documentation. For example, an API document source 115 may include a server, client computer, repository, etc. The one or more API document sources 115 may store API documents in any electronic format. Further the API documents may be machine-readable and/or human readable. The API documents may be in any language. For example, the API documents may be in any target human language (e.g., English, Japanese, German). In at least one embodiment, the one or more API document sources 115 may include an API information service offered by one electronic device to another electronic device, communicating with each other via the network 124 (e.g., the World Wide Web).

The network 124 may include any communication network configured for communication of signals between any of the components (e.g., 110, 115, and 128) of the operating environment 100. The network 124 may be wired or wireless. The network 124 may have numerous configurations including a star configuration, a token ring configuration, or another suitable configuration. Furthermore, the network 124 may include a local area network (LAN), a wide area network (WAN) (e.g., the Internet), and/or other interconnected data paths across which multiple devices may communicate. In some embodiments, the network 124 may include a peer-to-peer network. The network 124 may also be coupled to or include portions of a telecommunications network that may enable communication of data in a variety of different communication protocols.

In some embodiments, the network 124 includes or is configured to include a BLUETOOTH® communication network, a Z-Wave® communication network, an Insteon® communication network, an EnOcean® communication network, a wireless fidelity (Wi-Fi) communication network, a ZigBee communication network, a HomePlug communication network, a Power-line Communication (PLC) communication network, a message queue telemetry transport (MQTT) communication network, a MQTT-sensor (MQTT-S) communication network, a constrained application protocol (CoAP) communication network, a representative state transfer application protocol interface (REST API) communication network, an extensible messaging and presence protocol (XMPP) communication network, a cellular communications network, any similar communication networks, or any combination thereof for sending and receiving data. The data communicated in the network 124 may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, or any other protocol that may be implemented with the devices 106, cloud server communication, or gateway 110.

The data storage 128 may include any memory or data storage. The data storage 128 may include network communication capabilities such that other components in the operating environment 100 may communicate with the data storage 128. In some embodiments, the data storage 128 may include computer-readable storage media for carrying or having computer-executable instructions or data structures stored thereon. The computer-readable storage media may include any available media that may be accessed by a general-purpose or special-purpose computer, such as a processor. For example, the data storage 128 may include computer-readable storage media that may be tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may be included in the data storage 128.

The data storage 128 may store various data. The data may be stored in any data structure, such as a relational database structure. For example, the data storage 128 may include at least one ontology graph 145, a processed set of API documents 150, a set of extracted features 155, a mapping graph 160, etc.

The device 110 may include a generic API generator 126. In some embodiments, the generic API generator 126 may include a stand-alone application ("app") that may be downloadable either directly from a host or from an application store from the Internet. The generic API generator 126 may perform various operations relating to the API learning system and to the generation of a generic API, as described in this disclosure.

In operation, the generic API generator 126 may read an API document from one or more API document sources 115 and may extract features from the API documents. The generic API generator 126 may generate a semantic model (e.g., semantic view 700 of FIG. 7) of the API documents based on ontology of the API's documents. The generic API generator 126 may generate a graph of ontology (e.g., ontology 900 of FIG. 9) to extract features of the API. Then, the generic API generator 126 may use a semantic model (e.g., semantic model 800 of FIG. 8) to extract features of the API.

The generic API generator 126 may use machine learning methods to understand the functionality of different APIs based on unstructured documents (e.g., human readable) and/or heterogeneous APIs, and to provide a set of generic functions and accessibility to different APIs by mapping each extracted feature (e.g., native features) of APIs to the generic API features.

The generic API generator 126 may provide a classification of an API based on brand, type of device, supported network protocols and available actions. The generic API generator 126 may extract API features (e.g., type of input, type of output, API endpoint, access key, authentication). The generic API generator 126 may include a recommendation system based on Integration of multiple APIs (mashup APIs) and may find a new use case of different APIs. The generic API generator 126 may provide ease of use for software developer/end-user when they are using a generic API interface (IDE, GUI) for connecting to heterogeneous APIs (generic API function is mapping to heterogeneous native API functions).

Modifications, additions, or omissions may be made to the operating environment 100 without departing from the scope of the present disclosure. For example, the operating environment 100 may include any number of the described devices and services. Moreover, the separation of various components and servers in the embodiments described herein is not meant to indicate that the separation occurs in all embodiments. Moreover, it may be understood with the benefit of this disclosure that the described components and servers may generally be integrated together in a single component or server or separated into multiple components or servers.

FIGS. 2-4, 6, 10 and 12-13 illustrate flow diagrams of example methods related to an API learning system. The methods may be performed by processing logic that may include hardware (circuitry, dedicated logic, etc.), software (such as is run on a general purpose computer system or a dedicated machine), or a combination of both, which processing logic may be included in generic API generator 126 of FIG. 1, or another computer system or device. However, another system, or combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

Figure 2:
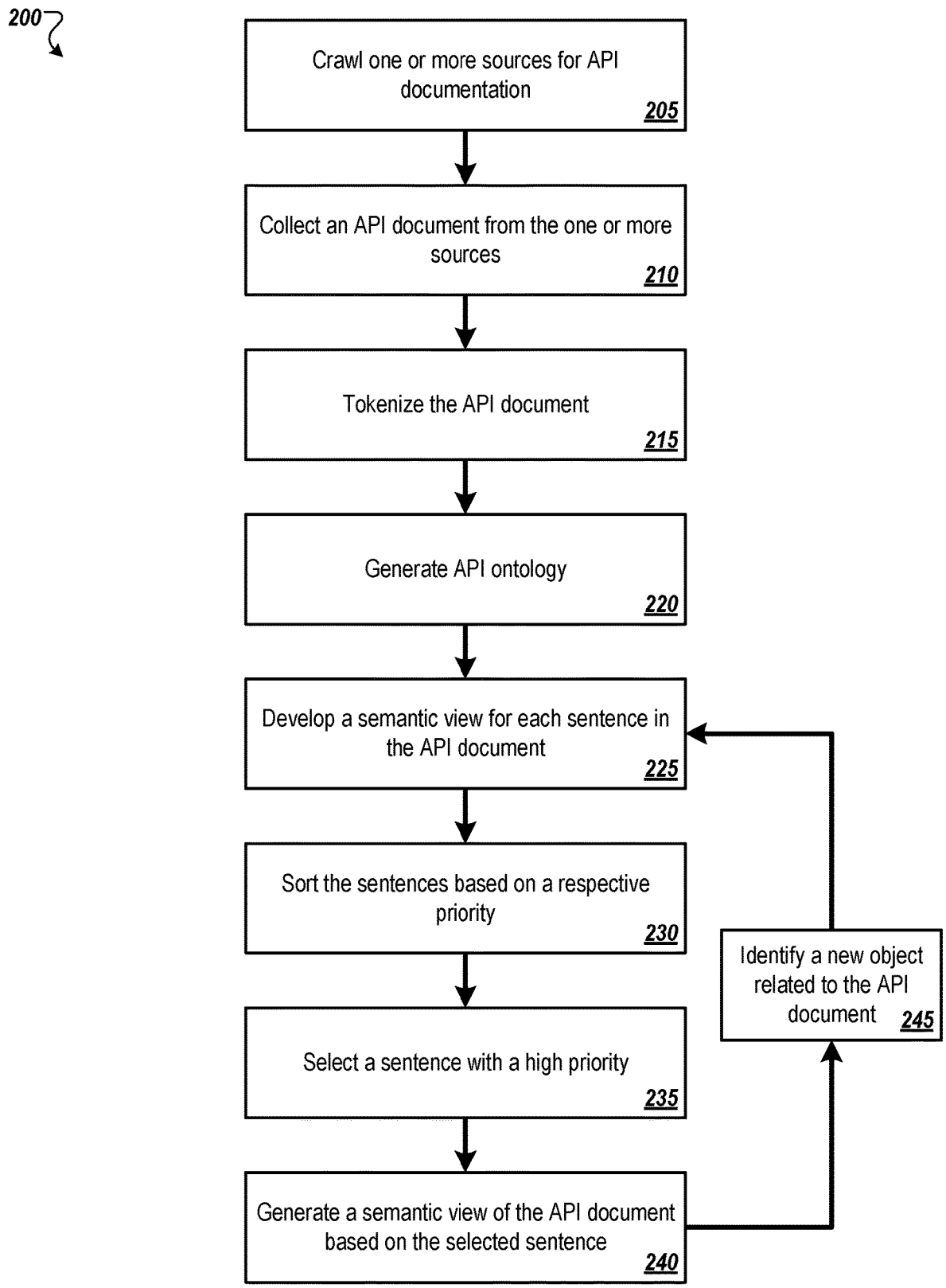
FIG. 2 illustrates a flow diagram of an example method related to an API learning system.

FIG. 2 illustrates a flow diagram of an example method 200 related to an API learning system. The method 200 may begin at block 205, where the processing logic may crawl one or more sources for API documentation. For example, the processing logic may crawl the one or more API documentation sources 115 of FIG. 1 for API documentation. The processing logic may crawl the one or more sources in response to a request to identify API documentation. For example, a software developer or end user may electronically submit a request to use an API or particular functionality using an API.

At block 210, the processing logic may collect any number of API documents from the one or more sources. The API documents may be in a target human language. The API documents may include one or more sentences.

At block 215, the processing logic may tokenize the API documents. Tokenization may refer to breaking a stream of text (e.g., a sentence) into words, phrases, symbols, or other meaningful elements called tokens. The list of tokens may become input for further processing such as parsing or text mining. In at least one embodiment, the processing logic may tokenize the API document according to the method of FIG. 3.

At block 220, the processing logic may generate an initial API ontology. The ontology may be defined based on any format, such as the Resource Description Framework (RDF) format. Using RDF as an example, the RDF may be parsed by different methods, such as SPARQL query processing method which is set forth by RDF Data Access Working Group (DAWG) of the World Wide Web Consortium (W3C). The initial ontology may classify an API based on its applications, properties, descriptions, methods and classes, as illustrated and further described with respect to FIG. 4. In embodiments with no available ontology for an API domain, the initial ontology may define a root structure of API ontology, as illustrated and further described with respect to FIG. 5. The processing logic may define the initial ontology based on a variety of ontologies including OS-based API, web-based API and Device-based API. To define or refine the initial API ontology, the processing logic may collect a corpus of a large number of API documentations. The corpus of API documentations may allow the initial ontology to be extended by adding a new entity, finding a new relationship between objects in the initial ontology, or finding a new relationship between entities, etc. Generating the API ontology may also include generating an API ontology graph, a method of which is illustrated and further described with respect to FIG. 6. An example ontology graph, is illustrated and further described with respect to FIG. 9.

At block 225, the processing logic may develop a semantic view for each sentence in the API document. An example semantic view is illustrated and further described with respect to FIG. 7. The processing logic may also update the semantic view process, such as in response to an addition of a new entity to the ontology or an extension of the initial ontology.

At block 230, the processing logic may sort the sentences based on a respective priority. Each sentence may, for example, have a respective priority. The processing logic may determine the respective priority or the respective priority may be predetermined. The respective priority may be generated based on a collected corpus, and a machine learning based model of the corpus that provides statistics of appearing different sentences in API documentations. The highest order in the model may show a probability of appearing different types of sentences in the corpus.

At block 235, the processing logic selects highest priority sentences. In at least one embodiment, the processing logic may select one or more sentences with highest priorities. A threshold parameter may allow API learning to select different numbers of highest priorities for the further processing.

At block 240, the processing logic may generate a semantic view of the API document based on the selected sentences. At block 245, the processing logic may identify a new object related to the API document and may proceed to block 225 for further processing of the new object.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 3:
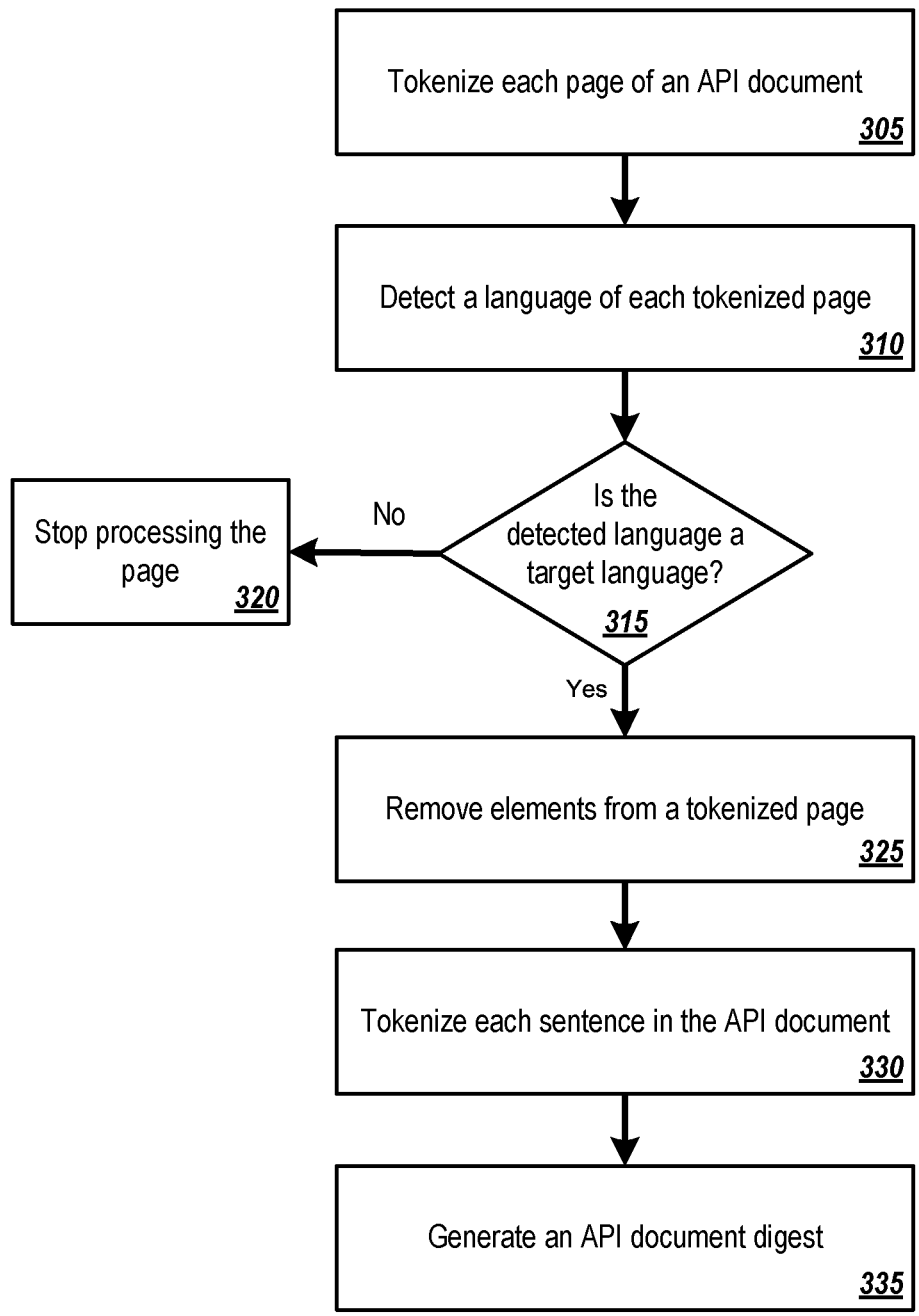
FIG. 3 illustrates a flow diagram of an example method related to tokenization of an API document.

FIG. 3 illustrates a flow diagram of an example method 300 related to tokenization of an API document. The API document may include one or more pages. The method 300 may begin at block 305, where the processing logic may tokenize each page of an API document. For example, the processing logic may tokenize sentences of the pages into tokens. A token may include a single word phrase or a multiple word phrase.

At block 310, the processing logic may detect a language of each tokenized page. The language may include a human-readable language.

At block 315, the processing logic may determine whether the detected language is a target language. The target language may be a predetermined language or set of languages or may be specified by a system administrator. When the detected language is not the target language ("NO" at block 315), the processing logic may stop processing the page at block 320.

When the detected language is the target language ("YES" at block 315), the processing logic may remove elements from one or more of the tokenized pages at block 325. The elements may include words or phrases which may not be important for further processing. Examples of such elements may be a word "the". At block 330, the processing logic may tokenize each word in the one or more tokenized pages. At block 335, the processing logic may generate an API document digest. The API document digest may include one or more of the tokenized words. The API document digest may include a set of clean pages of an API which is refined and is ready for the further processing which is further described in conjunction with FIG. 4.

Figure 4:
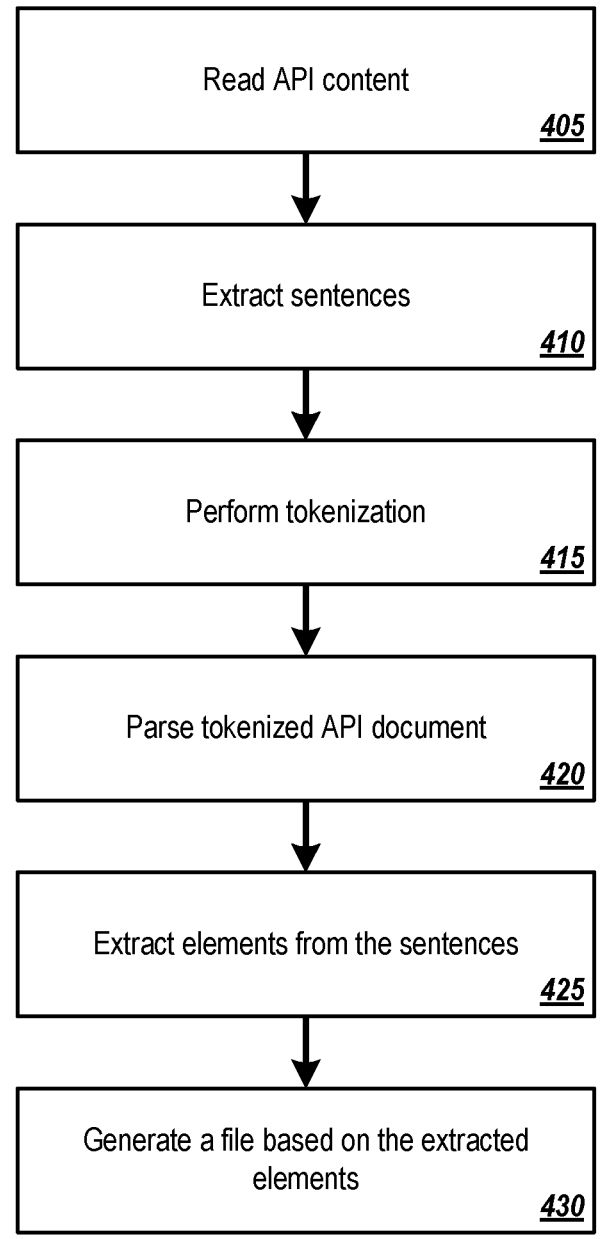
FIG. 4 illustrates a flow diagram of an example method related to generating an initial ontology to classify an API.

FIG. 4 illustrates a flow diagram of an example method 400 related to generating an initial ontology to classify an API. The method 400 may begin at block 405, where the processing logic may read API content in an API document. Reading the API content may include parsing and/or scanning text in the API document.

At block 410, the processing logic may extract one or more sentences from the API document. At block 415, the processing logic may tokenize the one or more extracted sentences, which may include dividing each sentence into two or more tokens. The tokens may be in a sequence representative of the order in which they appeared in the sentence. The processing logic may remove or eliminate any additional content outside of the sentences.

At block 420, the processing logic may parse the tokenized extracted sentences. The initial ontology may include the root structure of the ontology that may define the REST ontology. For example, it may include protocol types where the REST API documentations adds more definition to the protocol types. Each parsed token may include one or more elements. For example, each parsed token may be used to generate three elements that can be stored as a record of an RDF resource. In at least one embodiment, elements $F_i$ ($i^{th}$ Extracted API Feature) may be added as an entry to the ontology by using the three elements as a record of an RDF resource. In at least one embodiment, the ontology may be defined as an RDF resource. In at least one embodiment, the processing logic may parse the API and/or the tokenized extracted sentences based on one or more extraction rules. The extracted data may be stored as an RDF resource.

At block 425, the processing logic may extract one or more elements from the one or more sentences. For example, the processing logic may use the extraction rules to extract three elements (e.g., subject, relation, object) from each sentence. The processing logic may generate one or multiple triples which can be stored as a record in an RDF resource.

At block 430, the processing logic may generate a file based on the extracted elements. For example, the processing logic may generate an RDF file based on extracted triples that may be added to an "Object Description," as further described in conjunction with FIG. 5.

Figure 5:
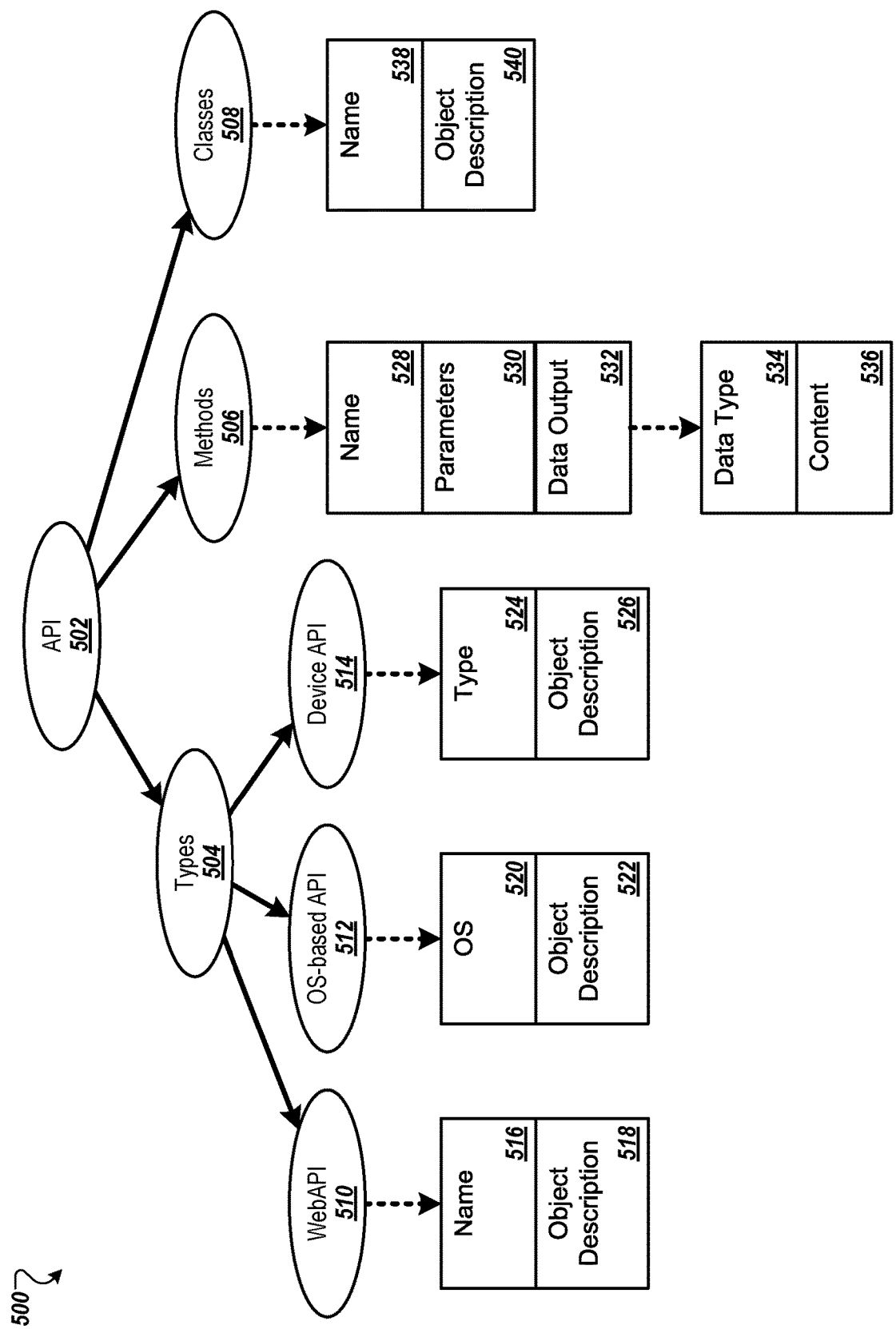
FIG. 5 illustrates an example initial ontology structure.

FIG. 5 illustrates an example of an initial ontology structure 500. The initial ontology structure 500 may include a generic API 502 and may have various types 504, methods 506 and classes 508. The types 504 may include a web-based API 510, an OS-based API 512 and a device API 514, among other types. The web-based API 510 may include a name 516 and an object description 518. The OS-based API 512 may include an OS 520 and an object description 522. The device API 514 may include a type 524 and an object description 526.

The methods 506 may include a name 528, one or more parameters 530 of the method, data output 532 of the method, a data type 534, and a content 536, among others. The classes 508 may include a name 538 and an object description 540.

Figure 6:
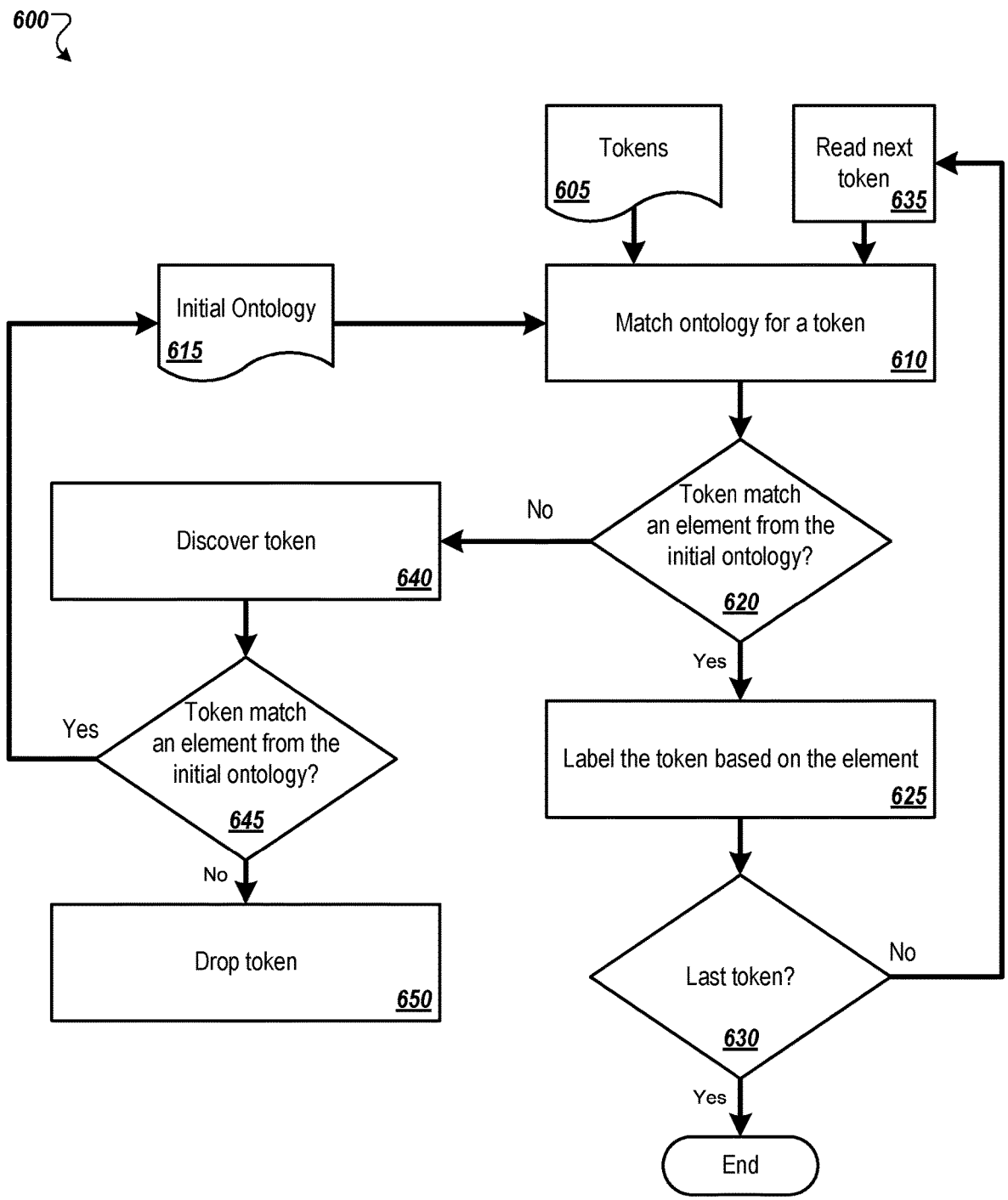
FIG. 6 illustrates a flow diagram of an example method related to generation of an ontology graph.

FIG. 6 illustrates a flow diagram of an example method 600 related to the generation of an ontology graph. The generated ontology graph may be the ontology graph 900, as further described in conjunction with FIG. 9. The ontology graph may be based on an initial ontology 615 and/or one or more tokens 605. The method 600 may begin at block 610, where the processing logic may match an ontology for a token 605. To match the ontology for the token 605, the processing logic may query one or more ontologies (such as the initial ontology 615) for the token 605.

At block 620, the processing logic may determine whether the token 605 matches an element from the initial ontology 615. When the token 605 matches an element from the initial ontology 615 ("YES" at block 620), the processing logic may label the token 605 based on the element in the initial ontology 615. At block 625, the processing logic may determine whether there are more tokens to attempt to match. When there are more tokens to attempt to match ("NO" at block 630), the processing logic may read the next token at block 635.

When the token 605 does not match an element from the initial ontology 615 ("NO" at block 620), the processing logic may discover the token 605. If a token is rejected by the current matching process at block 620, then the processing logic may have various options for further processing. For example, there may be two options: first, a new token may add a new definition to the initial ontology 615. In this case, at block 620, the processing logic may modify the initial ontology with a newly discovered element from block 640, and may be reprocessed at block 610. A second possibility may include a determination that the discover token of block 640 does not include any modification requirement for the initial ontology 615. In this case, the token may be dropped at block 650.

At block 645, the processing logic may determine whether the token 605 matches an element from the initial ontology 615. When the token 605 matches an element from the initial ontology 615 ("YES" at block 645), the processing logic may add the token 605 to the initial ontology 615. When the token 605 does not match an element from the initial ontology 615 ("NO" at block 645), the processing logic may drop the token 605 and/or cease processing of the token 605 if there is not any modification of the initial ontology 615.

Figure 7:
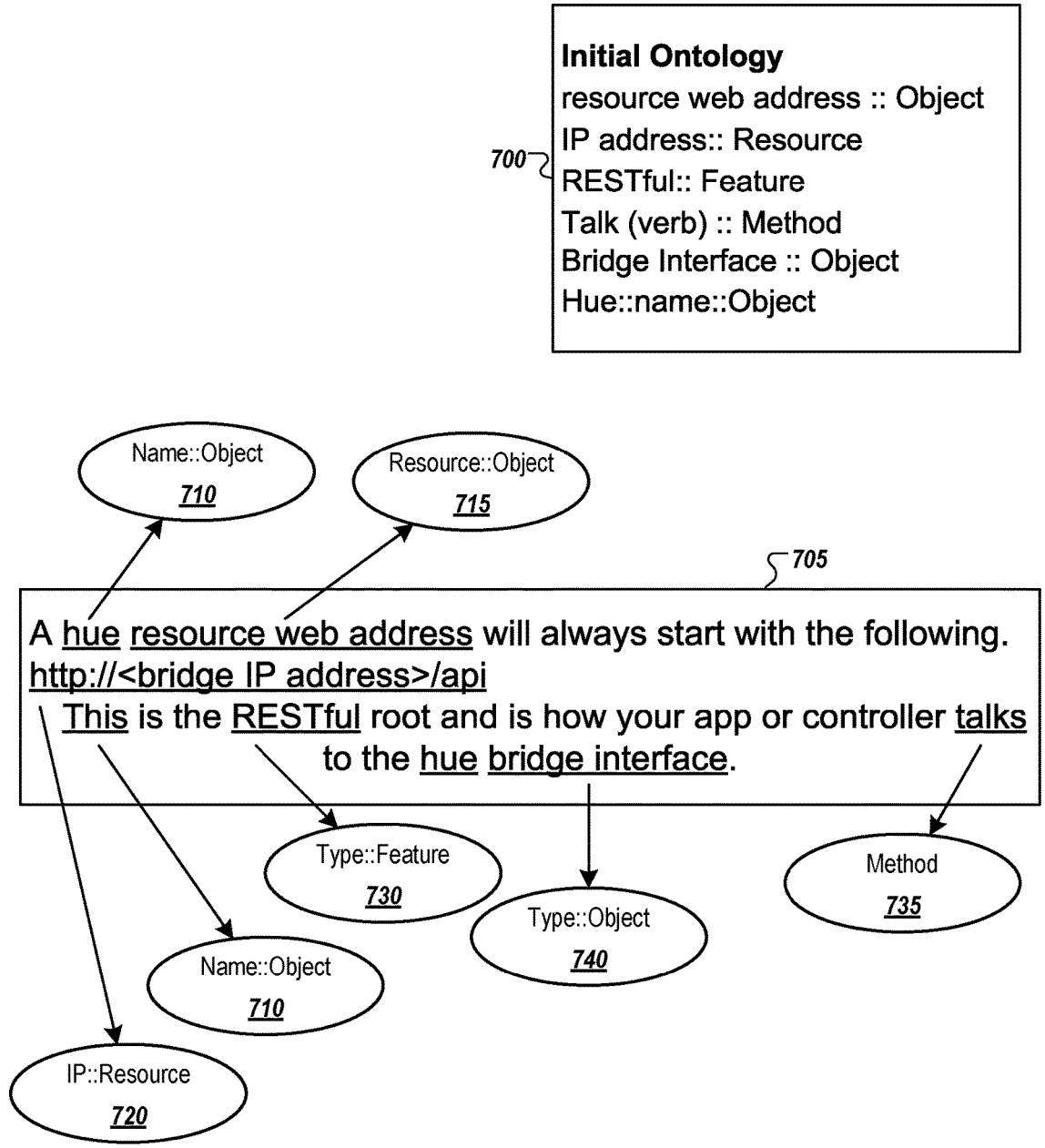
FIG. 7 illustrates a semantic view of an initial ontology and tagging process of a selected document based on an initial ontology.

FIG. 7 illustrates a semantic view 700 of an initial ontology and tagging process of a selected document based on the initial ontology. The selected document may include a document in a target human language (e.g., a document in the English language).

In at least one embodiment, the semantic view 700 may be formatted in Limited Context-Free Grammar (LCFG). For example, a Context-Free Grammar (CFG) may be limited for API documents based on the API ontology.

In at least one embodiment, an API document may be based on an LCFG that may be defined as a 4-tuple CFG. The 4-tuples may include: (N,Σ,R,S), where N is a set of non-terminals which represents non-terminals of an API ontology, Σ is a set of terminals which represents terminals of the API ontology, R is a set of rules where R⊆{A→β|A∈N and β ∈(N∪Σ)*} and the semantic view of an API document defines the rules (R), and a start symbol S (sentence).

Each page of an API document may be used to generate multiple tags for each sentence. One sentence, sentence 705, is illustrated for ease in explanation. Any number of sentences are contemplated.

As illustrated, a "hue" may be a tag for a name::object 710. A "resource web address" may be a tag for a resource::object 715. An http://<bridge IP address>/api may be a tag for an IP::resource 720. "RESTful" may be a tag for a type::feature 730. "Talks" may be a tag for a method 735. "Bridge interface" may be a tag for a type::object 740. The aggregation of all processed documents may be used to generate different tags' orders, as described in conjunction with FIG. 8.

In an example of controlling light using an API, there are many properties that may be controlled with hue. All of these properties may be associated with the/state resource of a light. For example, "on or off" may be a "/state" resource of the light and hue. Setting this resource to true may turn a light on to its last setting. Setting this resource to false may turn the light off.

In another example, the "/state" resource "bri" may indicate a brightness of a light from its minimum brightness (e.g., 0) to its maximum brightness (e.g., 254). In at least one embodiment, the minimum brightness may not be "off", and the light may actually return 1 when set to 0 and return 254 when set to 255. The "bri" resource may be set to a specific value. For example, the following commands may set the lights to 42/254 of their maximum brightness.

| Address | http://<bridge IP address>/api |
|---|---|
| Body | {"bri":42} |
| Method | PUT |

Figure 8:
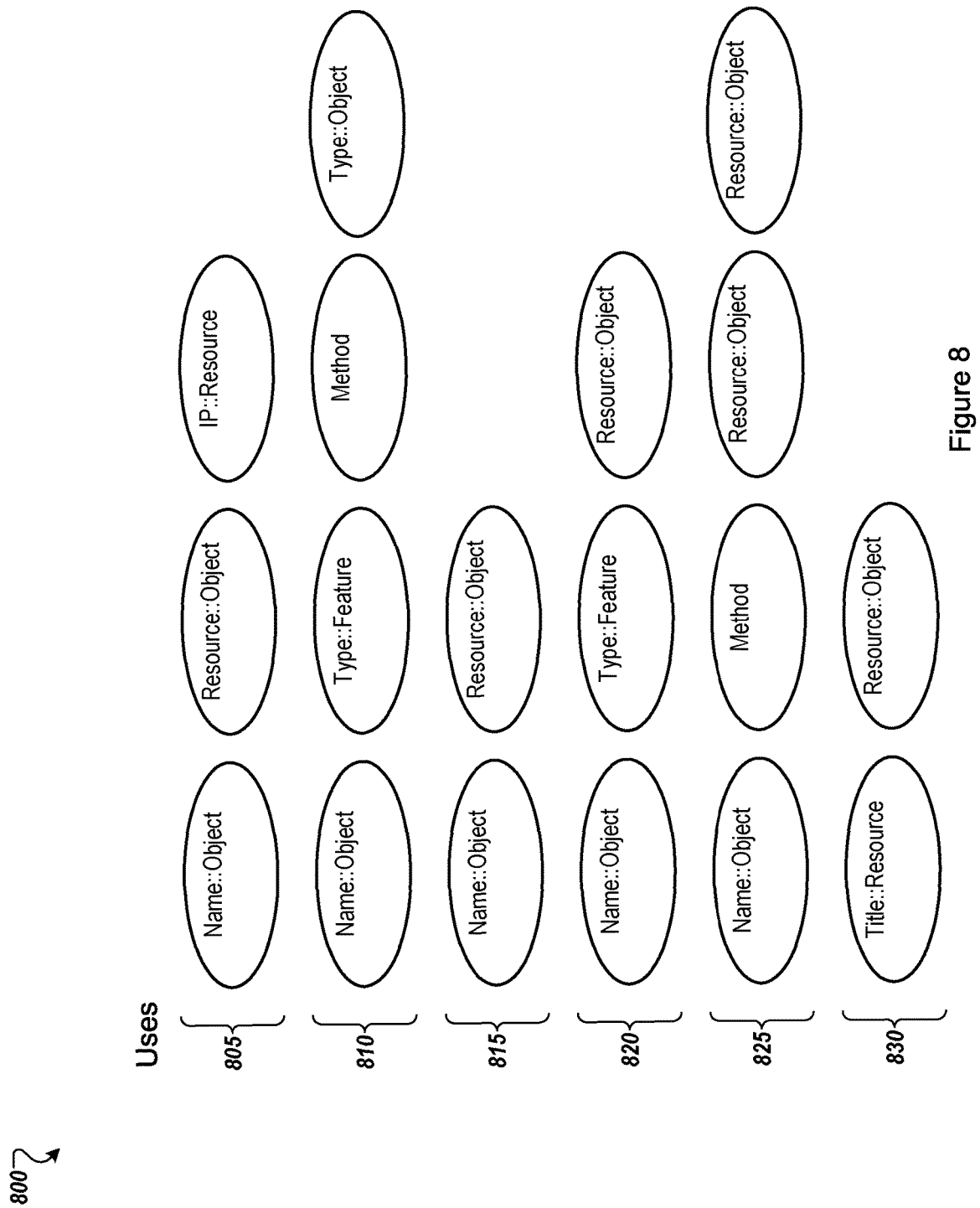
FIG. 8 illustrates an example ranking for the Probability of Limited CFG (PLCFG) for each of the tags of a semantic view of an API document.

FIG. 8 illustrates an example ranking 800 for the Probability of LCFG (PLCFG) for each of the tags of a semantic view of an API document. The PLCFG can be extracted by calculating the probability of different LCFG parsers (e.g., using a Probabilistic CKY method), and then select the highest ranks of tags' orders (e.g., the top 25% may be selected). As illustrated, group 805 may include an 85% PLCFG, group 810 may include a 71% PLCFG, group 815 may include a 25% PLCFG, group 820 may include a 15% PLCFG, group 825 may include a 10% PLCFG, and group 830 may include a 5% PLCFG. Thus, if the top 25% are to be selected, then groups 805, 810 and 815 may be selected.

Figure 9:
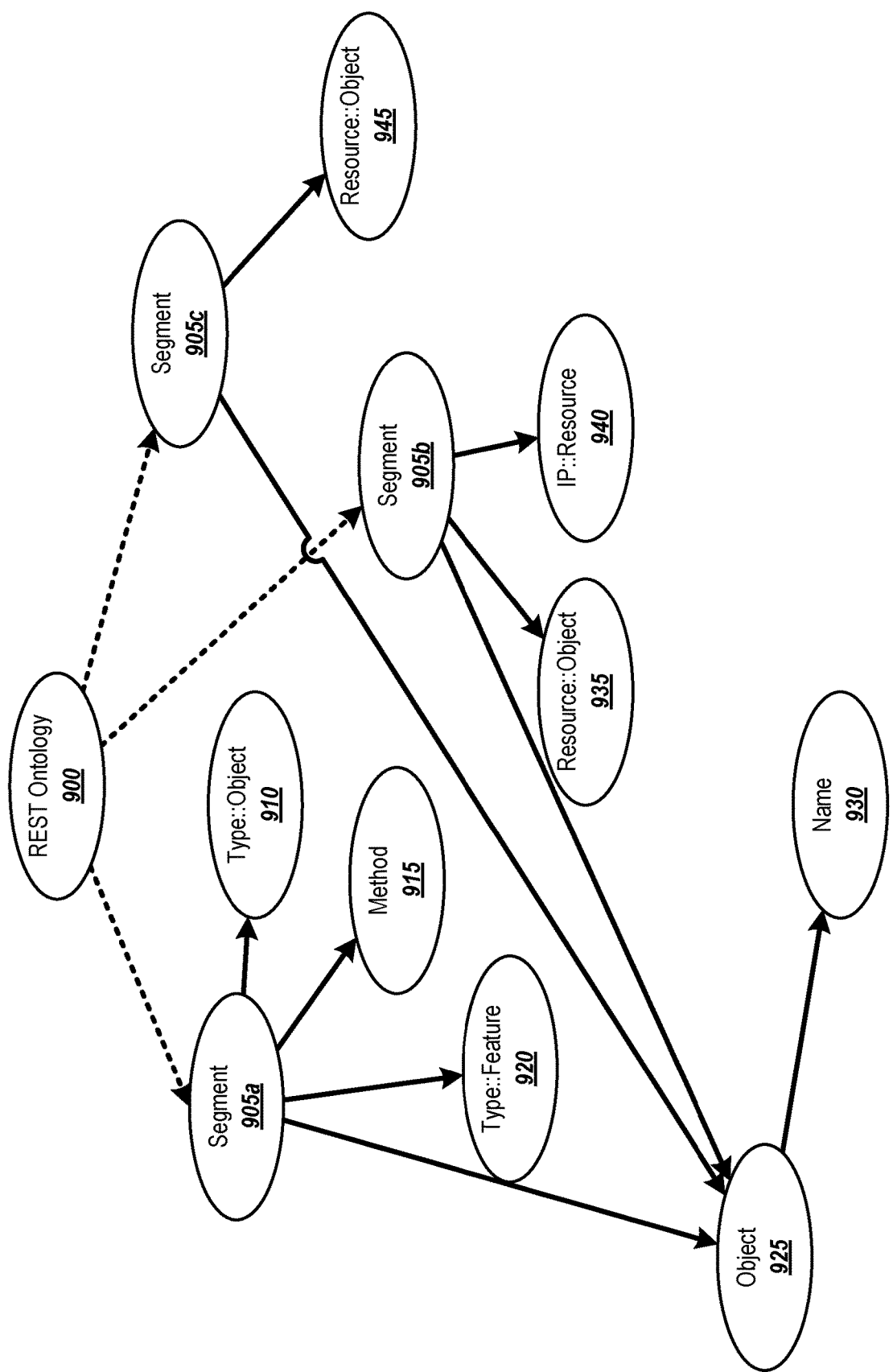
FIG. 9 illustrates an example ontology graph of a REST ontology.

FIG. 9 illustrates an example ontology graph of a REST ontology 900. The REST ontology 900 may be a superclass with one or more subclasses 905. As illustrated the subclasses may include segment 905a, segment 905b and segment 905c. Each subclass may include one or more properties. As illustrated, subclass segment 905a may include properties: type::object 910, method 915, type::feature 920, and object 925 with name 930. Subclass segment 905b may include properties: object 925 (which may be shared with subclass segment 905a), resource::object 935, and IP::resource 940. Subclass segment 905c may include properties: object 925 (which may be shared with subclass segment 905a) and resource::object 945.

Figure 10:
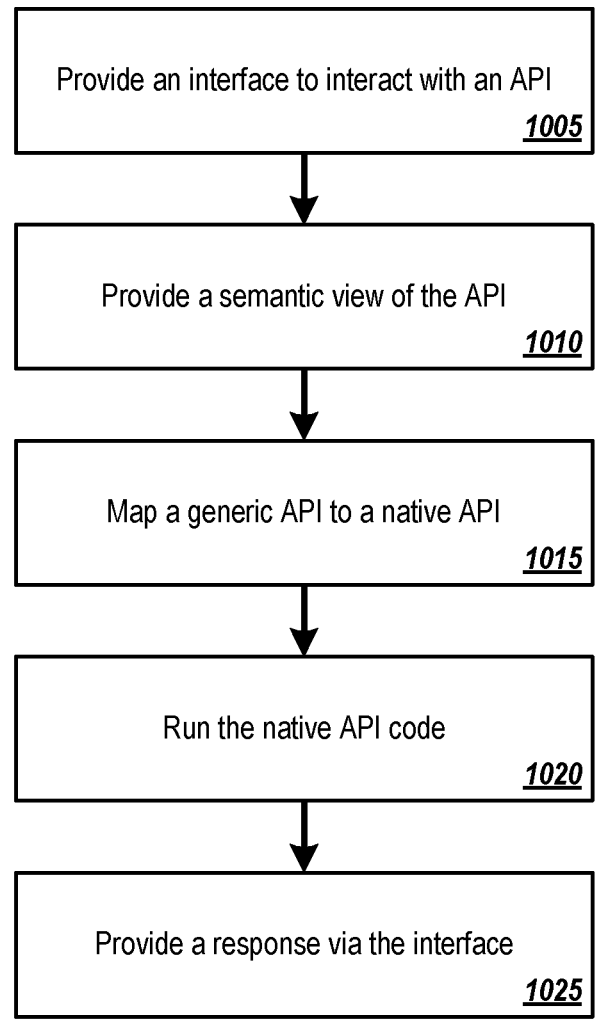
FIG. 10 illustrates a flow diagram of an example method related to using an API learning system.

FIG. 10 illustrates a flow diagram of an example method 1000 related to using an API learning system. The method 1000 may begin at block 1005, where the processing logic may provide an interface (e.g., an IDE and/or a GUI). At block 1010, the processing logic may provide a semantic view of the API. In at least one embodiment, the processing logic may provide a semantic view similar to the semantic view described in conjunction with FIG. 7. The processing logic may extract features from semantic view. The processing logic may generate a generic API which is mapped to native API codes. The processing logic may receive a request to execute a generic function.

At block 1015, the processing logic may map a generic API to a native API. For example, the processing logic may map features from the generic API functions to related functions of the native API. The processing logic may map the request from a generic code to a native code of the API. At block 1020, the processing logic may run the native API code. At block 1025, the processing logic may provide a response via the interface. For example, the response may include a message that a hue of a light has been decreased.

Figure 11:
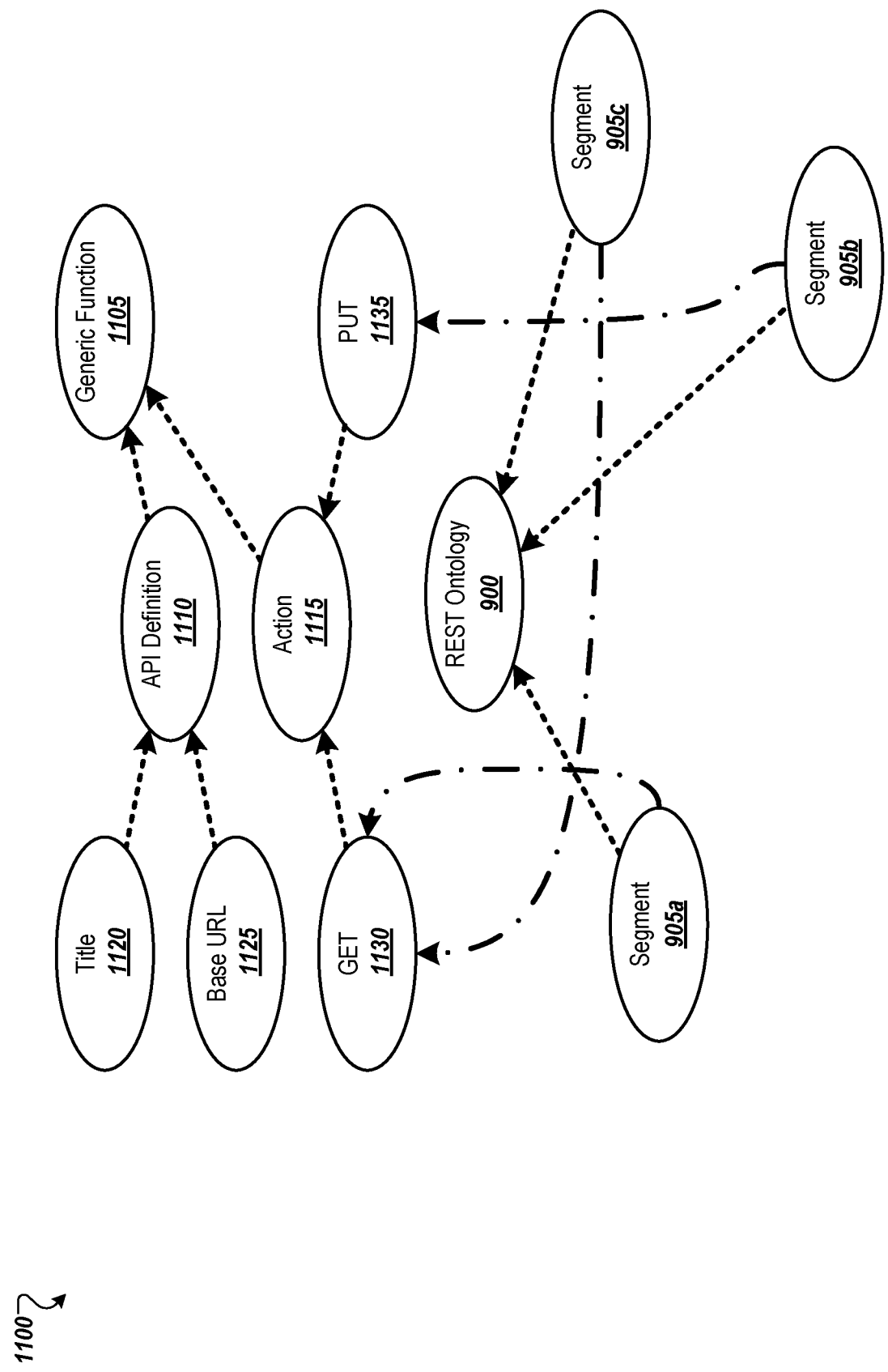
FIG. 11 illustrates an example mapping graph between generic API features and native API features.

FIG. 11 illustrates an example mapping graph 1100 between generic API features and native API features. The mapping graph 1100 may be used to map generic code to heterogeneous native API codes. The mapping graph 1100 may include at least a portion of an ontology graph. As illustrated, the mapping graph 1100 includes at least a portion of the REST ontology graph 900 of FIG. 9, which includes segments 905a, 905b, and 905c.

The mapping graph 1100 may include linked objects based on various classes of generic functions 1105. As illustrated, the generic function 1105 may include two classes: API definition 1110 and action 1115. The API definition 1110 may include any number of subclasses. Two subclasses are illustrated: title 1120 and base URL 1125. The action 1115 may include any number of subclasses. Two subclasses are illustrated: GET 1130 and PUT 1135. As illustrated, segment 905a is mapped to the GET 1130 function, segment 905b is mapped to the PUT 1135 function, and segment 905c is mapped to the GET function 1130.

Figure 12:
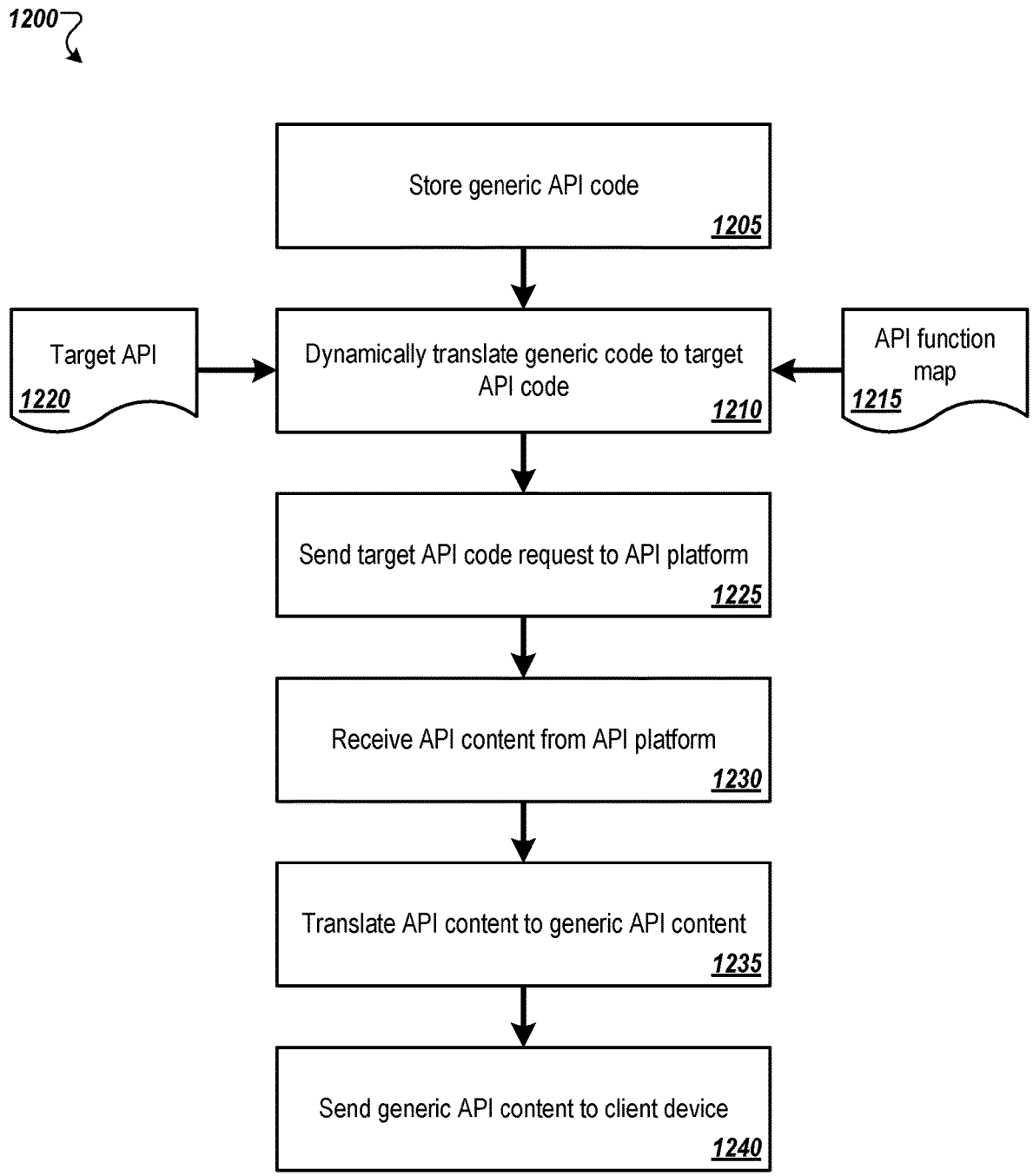
FIG. 12 illustrates a flow diagram of an example method related to using a generic API function to execute a native API function.

FIG. 12 illustrates a flow diagram of an example method 1200 related to using a generic API function to execute a native API function. The method 1200 may begin at block 1205, where the processing logic may store generic API code. The processing logic may receive an instruction to execute a function of the generic API code from a developer or an end-user.

At block 1210, the processing logic may dynamically translate the generic code to native API code (target code). To dynamically translate the generic code to the target API code, the processing logic may use an API function map (e.g., the mapping graph 1100 of FIG. 11) to identify target code 1220. The API function map may provide a map or relationship between a specific API function and a generic API. The API function map may indicate keywords or another indicator of the API function.

At block 1225, the processing logic may send a target API code request (e.g., at least a portion of code of the target API 1220) to an API platform. The API platform may include a local computer and/or a remote computer. In at least one embodiment, the API platform includes the API document source 115 of FIG. 1. The target API code request may include a request for the API platform to execute the API and to send the resulting data to the processing logic. The target API code request may also include a request to send the target API code for execution by the processing logic.

At block 1230, the processing logic may receive API content from the API platform. The API content may include specific API code or data obtained as a result of execution of the API code. At block 1235, the processing logic may translate the API content to generic API content. For example, the processing logic may translate data returned from an execution of the API content into data that may be useable by the generic API. At block 1240, the processing logic may send the generic API content to a client device.

Figure 13:
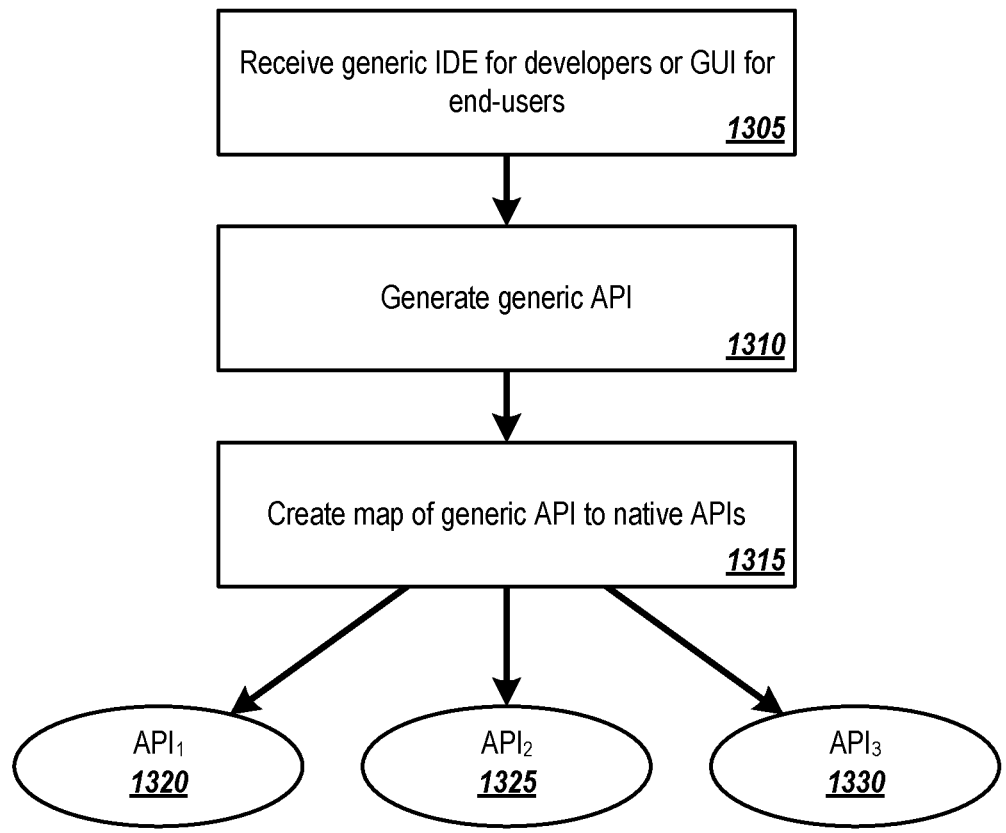
FIG. 13 illustrates a flow diagram of an example method related to an interface in an API learning system.

FIG. 13 illustrates a flow diagram of an example method 1300 related to an interface in an API learning system. The method 1300 may begin at block 1305, where the processing logic may receive a generic IDE for developers or a GUI for end-users. The processing logic may store the generic IDE and/or GUI in a data storage. The processing logic may generate a generic API, as discussed herein. At block 1310, the processing logic may create a map of the generic API to more than one native APIs. The more than one native APIs may include $API_1$ 1320, $API_2$ 1325 and $API_3$ 133.

The embodiments described herein may include the use of a special purpose or general purpose computer including various computer hardware or software modules, as discussed in greater detail below.

Figure 14:
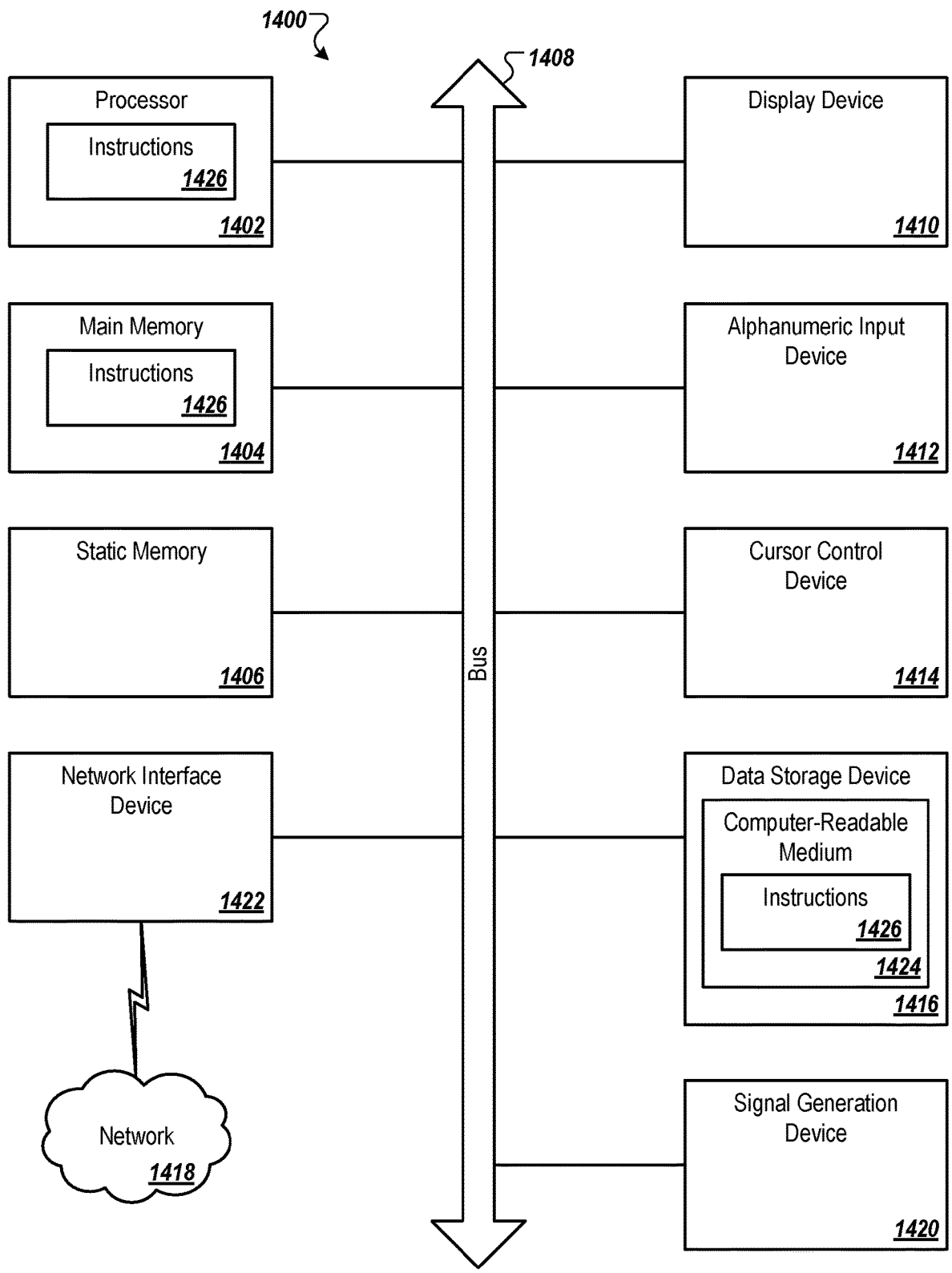
FIG. 14 illustrates a diagrammatic representation of a machine in the example form of a computing device within which a set of instructions, for causing the machine to perform any one or more of the methods discussed herein, may be executed, all arranged in accordance with at least one embodiment described herein.

FIG. 14 illustrates a diagrammatic representation of a machine in the example form of a computing device 1400 within which a set of instructions, for causing the machine to perform any one or more of the methods discussed herein, may be executed. The computing device 1400 may include a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methods discussed herein, may be executed. In alternative embodiments, the machine may be connected (e.g., networked) to other machines in a LAN, an intranet, an extranet, or the Internet. The machine may operate in the capacity of a server machine in a client-server network environment. The machine may include a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" may also include any collection of machines that individually or jointly execute a set (or multiple sets) of instructions to perform any one or more of the methods discussed herein.

The example computing device 1400 includes a processing device (e.g., a processor) 1402, a main memory 1404 (e.g., read-only memory (ROM), flash memory, dynamic random access memory (DRAM) such as synchronous DRAM (SDRAM)), a static memory 1406 (e.g., flash memory, static random access memory (SRAM)) and a data storage device 1416, which communicate with each other via a bus 1408.

Processing device 1402 represents one or more general-purpose processing devices such as a microprocessor, central processing unit, or the like. More particularly, the processing device 1402 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1402 may also include one or more special-purpose processing devices such as an application specific integrated circuit (ASIC), a field programmable gate array (FPGA), a digital signal processor (DSP), network processor, or the like. The processing device 1402 is configured to execute instructions 1426 for performing the operations and steps discussed herein.

The computing device 1400 may further include a network interface device 1422 which may communicate with a network 1418. The computing device 1400 also may include a display device 1410 (e.g., a liquid crystal display (LCD) or a cathode ray tube (CRT)), an alphanumeric input device 1412 (e.g., a keyboard), a cursor control device 1414 (e.g., a mouse) and a signal generation device 1420 (e.g., a speaker). In one implementation, the display device 1410, the alphanumeric input device 1412, and the cursor control device 1414 may be combined into a single component or device (e.g., an LCD touch screen).

The data storage device 1416 may include a computer-readable storage medium 1424 on which is stored one or more sets of instructions 1426 (e.g., device 110, generic API generator 126) embodying any one or more of the methods or functions described herein. The instructions 1426 may also reside, completely or at least partially, within the main memory 1404 and/or within the processing device 1402 during execution thereof by the computing device 1400, the main memory 1404 and the processing device 1402 also constituting computer-readable media. The instructions may further be transmitted or received over a network 1418 via the network interface device 1422.

While the computer-readable storage medium 1426 is shown in an example embodiment to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A system, comprising:
    a memory;
    a communication interface; and
    a processor operatively coupled to the memory and the communication interface, the processor being configured to perform operations comprising:
        crawl, via the communication interface, one or more sources for application program interface (API) documentation;
        collect, via the communication interface, an API document from the one or more sources;
        tokenize the API document to create at least one token based on content of the API document, the content includes at least two sentences;
        generate an API ontology graph based on the at least one token;
        develop a semantic view for each of the at least two sentences based on the API ontology graph;
        associate a priority with each of the at least two sentences;
        select a first sentence of the at least two sentences based on a first priority of the first sentence;
        revise the semantic view of the API document based on the first sentence;
        generate a generic API which is mapped to native API codes;
        receive a request to execute a generic function;
        map the request from a generic code to a native code of the generic API;
        cause a native function of the generic API to be executed, wherein the native function of the generic API corresponds to the generic function; and
        provide, via a particular interface, a response based on an execution of the native function of the generic API.

2. The system of claim 1, wherein the API document includes a human readable document in a human-readable language.

3. The system of claim 1, wherein the priority is based on a probability of a Context-Free Grammar that is limited based on the API ontology.

4. The system of claim 1, wherein the processor is further configured to periodically crawl the one or more sources for an update to the API document.

5. The system of claim 4, wherein the processor is further configured to perform operations comprising:
    tokenize the update to the API document to create a second token based on the update to the API document; and
    update, based on the second token, at least one of the API ontology graph, the first semantic view, or the second semantic view.

6. The system of claim 1, wherein the processor is configured to perform further operations comprising:
provide the particular interface to interact with the API;
provide a second semantic view of the API document via the particular interface; and
extract features from second semantic view.

7. The system of claim 6, wherein the processor is further configured to map the generic function to the native function of the API.

8. The system of claim 7, wherein the native function of the API includes at least one of an operation, a parameter, or an accessibility of the native function of the API.

9. The system of claim 1, wherein the API includes at least one of a web-based API, a device API, or an operating system-based API.

10. A method, comprising:
crawling, via a communication interface, one or more sources for application program interface (API) documentation;
collecting, via the communication interface, an API document from the one or more sources;
tokenizing the API document to create at least one token based on content of the API document;
associating a priority with each sentence;
generating an API ontology graph for a first semantic view based on the at least one token;
selecting a sentence based on probability of appearing in the corpus which is computed by machine learning methods;
developing the first semantic view for each API document based on the API ontology graph;
revising the first semantic view of the API document to generate the second semantic view once API documents are updated;
providing a particular interface to interact with an API;
providing the second semantic view of the API document via the particular interface;
receiving a request to execute a generic function based on the API document;
causing a native function of the API to be executed, wherein the native function of the API corresponds to the generic function; and
providing, via the particular interface, a response based on an execution of the native function of the API.

11. The method of claim 10, wherein the one or more sources are periodically crawled for an update to the API document.

12. The method of claim 11 further comprising:
tokenizing the update to the API document to create a second token based on the update to the API document; and
updating, based on the second token, at least one of the API ontology graph, the first semantic view, or the second semantic view.

13. The method of claim 10 further comprising mapping the generic function to the native function of the API.

14. The method of claim 13, wherein the native function of the API includes at least one of: an operation, a parameter, or an accessibility of the native function of the API.

15. A non-transitory computer-readable medium having encoded therein programming code executable by a processor to perform operations comprising:
crawling, via a communication interface, one or more sources for application program interface (API) documentation;
collecting, via the communication interface, an API document from the one or more sources;
tokenizing the API document to create at least one token based on content of the API document, the content includes at least two sentences;
generating an API ontology graph based on the at least one token;
associating a probability of appearing sentences;
selecting one or more of the highest probability rates;
generating the first semantic view of the API document based on the one or more selected highest probability rates;
revising the first semantic view of the API document;
providing a particular interface to interact with an API;
providing a semantic view of the API document via the particular interface;
receiving a request to execute a generic function based on the API document;
causing a native function of the API to be executed, wherein the native function of the API corresponds to the generic function; and
providing, via the particular interface, a response based on the execution of the native function of the API.

16. The non-transitory computer-readable medium of claim 15, wherein the one or more sources are periodically crawled for an update to the API document.

17. The non-transitory computer-readable medium of claim 16, the operations further comprising:
tokenizing the update to the API document to create a second token based on the update to the API document; and
updating, based on the second token, at least one of the API ontology graph, the first semantic view to generate the second semantic view.

18. The non-transitory computer-readable medium of claim 15, the operations further comprising mapping the generic function to the native function of the API.

* * * * *